United States Patent [19]
Steinle et al.

[11] Patent Number: 5,300,767
[45] Date of Patent: Apr. 5, 1994

[54] COLOR IMAGE SENSING ASSEMBLY WITH MULTIPLE LINEAR SENSORS AND ALIGNED FILTERS

[75] Inventors: Michael J. Steinle, Fort Collins; Steven L. Webb, Loveland, both of Colo.; Hans D. Neumann, Los Altos, Calif.

[73] Assignee: Hewlett-Packard Company, Palo Alto, Calif.

[21] Appl. No.: 63,838

[22] Filed: May 19, 1993

Related U.S. Application Data

[63] Continuation of Ser. No. 869,273, Apr. 15, 1992, abandoned.

[51] Int. Cl.⁵ .............................................. H01J 40/14
[52] U.S. Cl. ........................... 250/208.1; 250/226; 358/512
[58] Field of Search ............... 250/208.1, 226; 358/75, 358/44, 41, 212, 213.11, 213.13, 213.27, 213.28; 359/629, 637, 638

[56] References Cited

U.S. PATENT DOCUMENTS

| | | |
|---|---|---|
| 4,709,144 | 11/1987 | Vincent . |
| 4,783,696 | 11/1988 | Neumann et al. . |
| 4,812,900 | 3/1989 | Kadowaki et al. . |
| 4,896,217 | 1/1990 | Miyazawa et al. . |
| 4,985,760 | 1/1991 | Maeshima et al. ................. 358/75 |
| 4,994,907 | 2/1991 | Allen ................................... 358/75 |
| 5,019,703 | 5/1991 | Boyd et al. . |
| 5,040,872 | 8/1991 | Steinle ................................ 359/637 |
| 5,044,727 | 9/1991 | Steinle . |
| 5,161,008 | 11/1992 | Funk . |

FOREIGN PATENT DOCUMENTS

3618646A1 12/1987 Fed. Rep. of Germany .
3936930C1 5/1990 Fed. Rep. of Germany .

OTHER PUBLICATIONS

Patent Abstracts of Japan–vol. 2, No. 125 (E–065) Oct. 20, 1978 & JP-A-53 092 621 (Matsushita Denki Sangyo K.K.) 14 Aug. 1978.

*Primary Examiner*—David C. Nelms
*Assistant Examiner*—Que T. Le

[57] ABSTRACT

An optical scanning device for generating a data signal representative of an object which is scanned comprising a light source for illuminating the object; an imaging assembly for projecting imaging light from the object onto an image plane; a plurality of linear photosensor arrays positioned at the image plane for generating light sensing signals indicative of the intensity of light in different spectral regions impinged thereon; a transparent plate positioned in adjacent overlying relationship with the photosensor arrays; a plurality of filter coatings disposed on different regions of the transparent plate in alignment the plurality of photosensor arrays for filteringly transmitting imaging light in the predetermined different spectral regions to the different photosensor arrays.

22 Claims, 3 Drawing Sheets

COLOR IMAGE SENSING ASSEMBLY WITH MULTIPLE LINEAR SENSORS AND ALIGNED FILTERS

CROSS REFERENCE TO RELATED APPLICATION

This is a continuation of copending application Ser. No. 07/869,273 filed on Apr. 15, 1992, now abandoned.

BACKGROUND OF THE INVENTION

The present invention relates generally to optical scanners and, more particularly to color optical scanners and photosensors used therein.

Optical scanners operate by imaging an object and then separating the imaging light into its spectral components, typically red, green, and blue. Separate color component images are sensed by different optical sensor arrays which each generate a signal representative of the associated color component image which is sensed. These data signals from the different sensors are then processed and stored on a suitable medium, e.g. a hard disk of a computer or video tape of a camcorder for subsequent display and/or manipulation.

A number of color scanning devices are described in U.S. Pat. No. 4,709,144 for COLOR IMAGER UTILIZING NOVEL TRICHROMATIC BEAMSPLITTER AND PHOTOSENSOR of Vincent issued Nov. 24, 1987; U.S. Pat. No. 4,783,696 for COLOR IMAGE INPUT APPARATUS WITH VARIOUS ELEMENTS HAVING MATCHED APERTURES of Neumann et al. issued Nov. 8, 1988; U.S. Pat. No. 5,019,703 for OPTICAL SCANNER WITH MIRROR MOUNTED OCCLUDING APERTURE OR FILTER of Boyd et al. issued May 28, 1991; and U.S. Pat. No. 5,044,727 for BEAM SPLITTER/COMBINER APPARATUS of Steinle issued Aug. 13, 1991 which are each hereby specifically incorporated by reference for all that is disclosed therein. Scanners typically employ linear sensor arrays which sense imaging light from a scan line portion of an object. A linear sensor array comprises a single row of picture elements or "pixels" which each generate a signal representative of the intensity of the light impinged thereon. A typical pixel dimension in a linear sensor array of a color optical scanner is 0.008 mm×0.008 mm.

Some optical scanners employ a three-line, CCD (charge coupled device) photosensor unit which is used to simultaneously sense red, green and blue imaging light from the scanned object. One method of filtering the component light beams which are sensed by a three-line CCD unit is to pass the imaging light beam through multiple reflective color filter coatings applied to glass plates located between an imaging lens assembly and the three-line CCD unit. Such filtering methods are used with beamsplitter devices such as described in detail in the above referenced patents of Vincent, Boyd et al. and Steinle.

U.S. Pat. No. 4,783,696 of Neumann et al. discloses a color image input apparatus which includes a support assembly, and beam forming assembly, a projection assembly, and a sensor assembly. The support assembly includes an opaque platen provided with an elongate aperture. The beam forming assembly includes a pair of front reflecting mirrors and a filter assembly. The filter assembly includes three filter windows, each of which includes a transmissive color separation filter. Light shining through a first filter window produces a blue beam, light shining through a second filter window produces a green beam, and light shining through a third filter window produces a red beam. The projection assembly typically includes a number of lenses and an aperture forming iris. The sensor assembly includes three photoelectric sensor arrays. The projection assembly focuses the red beam on the first sensor array, the green beam on the second sensor array, and the blue beam on the third sensor array. The outputs of the sensor assembly form a red/green/blue signal which represents the portion of the color image on a transparency which is aligned with the support assembly aperture. The blue, green and red beams are transposed and focused by the projection assembly. The photoelectric sensor arrays, which are typically formed from a matrix of photosensitive semiconductor devices, convert the intensities of various portions of the red, green, and blue beams to form the red/green/blue signal.

Another known method of filtering imaging light which is to be impinged upon a three-line CCD unit is to apply a filter coating directly to each linear CCD array. Three-line CCD units which have different color filters deposited directly on the linear CCD arrays are known in the art and are commercially available. However there are several disadvantages which are associated with such CCD units:

1) The deposited filter material must be compatible with the silicon substrate material from which the CCD is constructed. There are only a limited number of filter materials which are suitable for deposit on a CCD substrate. The spectral response bandwidths available from such deposited filters is limited and may not be suitable for some imaging device applications where high color fidelity is required.

2) The efficiency or transmissibility of filters deposited directly onto the CCD sensor arrays is relatively low and thus when such coated sensors are used it may be necessary to use expensive, highly efficient optics.

3) The production process for depositing filter coatings directly onto CCD arrays is rather expensive. Additionally, if a process error occurs during the filter deposit process the entire silicon substrate must be scrapped at considerable expense.

It is an object of the present invention to provide a filter and sensor assembly which overcomes these problems in the art.

SUMMARY OF THE INVENTION

The present invention is directed to a light sensor assembly of the type which is used in a color imaging device such as an optical scanner. The light sensor assembly includes a plurality of spatially separated photosensor arrays which each generate light sensing signals indicative of the intensity of the light which is impinged on the photosensor array. In one embodiment, the photosensor arrays are linear photosensor arrays which are positioned in parallel relationship on a common plane. The light sensor assembly also includes a transparent plate which is positioned in overlying relationship with the plurality of separate photosensor arrays. One surface of the transparent plate has filter coatings applied to adjacent regions thereof which are aligned with the underlying photosensor arrays. A filter coating of a different spectral range is aligned with each of the different photosensor arrays.

The light sensor assembly is particularly adapted to be positioned at the image plane of an associated color scanner. Imaging light from an object passes through the transparent plate and the filter coating associated with each photosensor array prior to impinging upon the photosensor ray. The photosensor arrays generate data signals representative of a color component image of different portions of the object which is being imaged. These data signals may be manipulated and stored in a manner such that a color component image of the object may be reproduced from the stored data.

In one preferred embodiment, the filter coatings applied to the glass plate are dichroic filter coatings. Dichroic filter coatings are relatively high efficiency filters and are available in many different spectral ranges. Thus the present invention offers a broader range of spectral-response band widths than are available in CCD image sensors in which the filter coatings are deposited directly upon the CCD's. The present invention is therefore capable of producing higher fidelity color than CCD sensor assemblies having direct deposit filters. The greater efficiency of dichroic coatings which may be applied to a glass plate render the present invention capable of being used with less expensive optics than those used with CCD photosensors having direct deposit filters. Furthermore, since glass plates are relatively inexpensive a process error in the filter coating process of the present invention only necessitates the scrapping of a relatively inexpensive glass cover plate, not an entire CCD substrate.

Thus, the present invention enables the construction of a less expensive, more efficient, and higher color fidelity sensing device than that which is available using current CCD sensor technology.

DETAILED DESCRIPTION OF THE INVENTION

Figure 1:
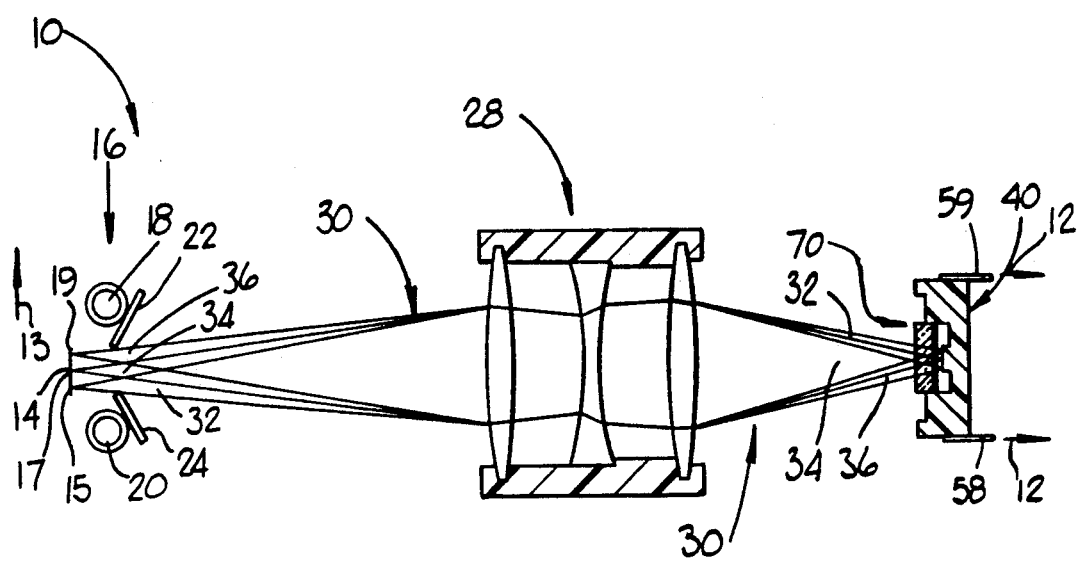
FIG. 1 is a schematic, cross-sectional side elevation view of an optical imaging device.

FIG. 1 illustrates an optical scanning device 10 for generating a data signal 12 representative of an object 14 which is being scanned. The optical scanning device comprises a light source assembly 16 such as fluorescent bulbs 18, 20 which are adapted to illuminate an object 14 and which are shielded from scanner optics as by light blocking shields 22, 22. An imaging assembly 28 which may comprise an imaging lens assembly of the type described in U.S. Pat. No. 5,044,727 incorporated by reference above, is provided for imaging light reflected from the scan object 14. The imaging assembly 28 images the light (i.e. projects an image of the object) onto an image plane II. As explained in detail in the above cited patents a scanner operates by sensing a continuing series of scan line portions of an object as the object is moved in a scan path direction 13 relative to the imaging assembly of the scanner (or as the scanner imaging assembly is moved relative to the object).

Figure 2:
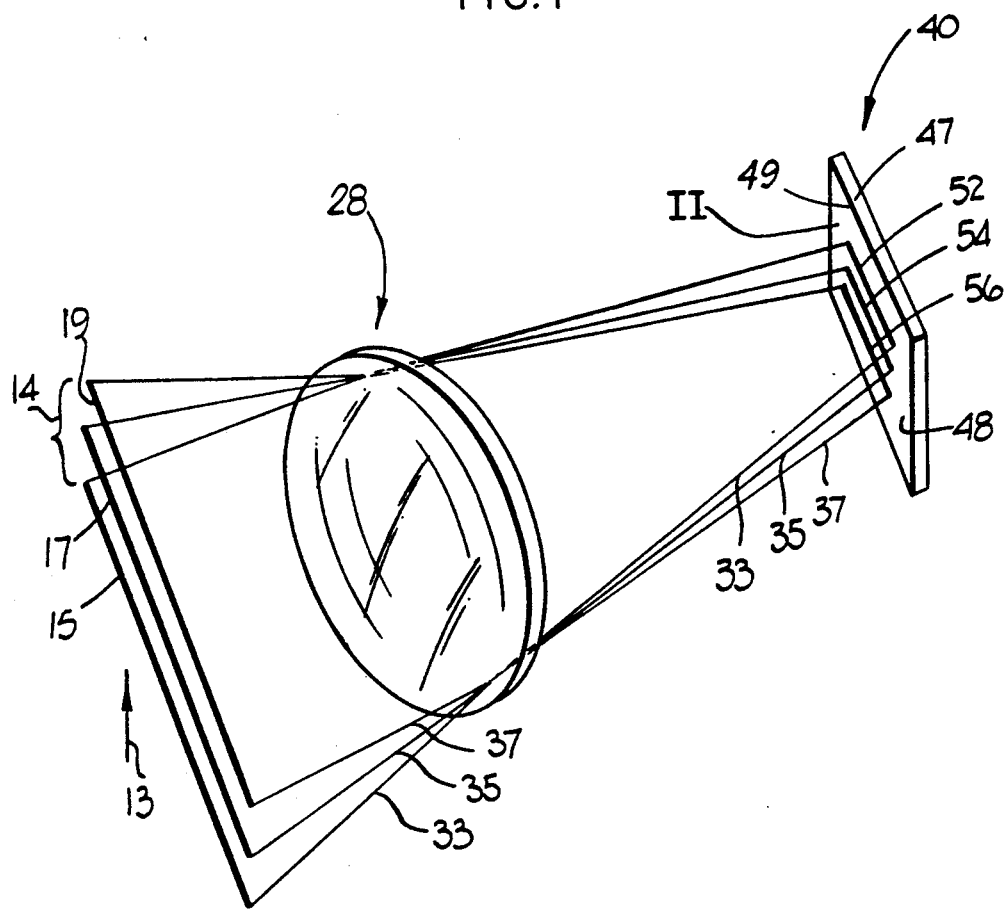
FIG. 2 is a schematic perspective view showing certain features of the imaging device of FIG. 1.
Figure 3:
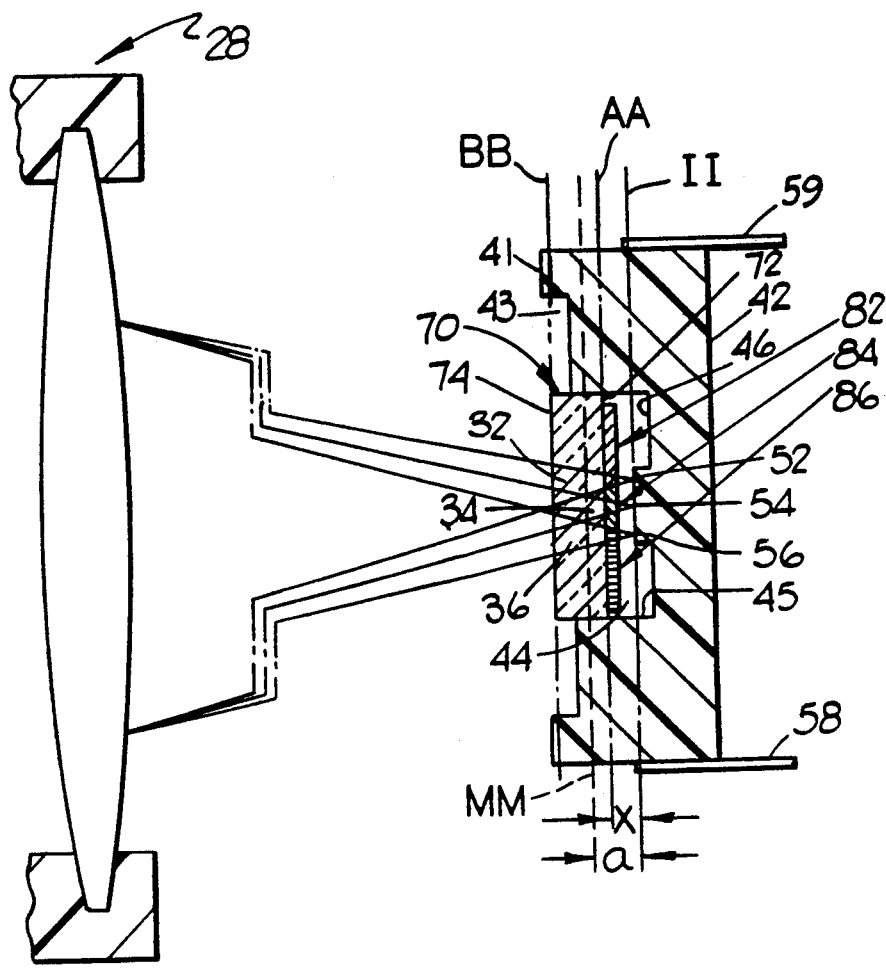
FIG. 3 is a detail side elevation view of a portion of a lens assembly and a portion of a photosensor assembly of the imaging device of FIG. 1.

For the purpose of understanding the present invention, it is useful to consider an object 14 which is imaged to consist of a continuous series of adjacent scan line portions extending perpendicular to the scan direction 13. FIG. 1-3 illustrates the manner in which three spaced apart scan line portions 15, 17, 19 of image 14 are imaged on image plane II as line images 52, 54, 56 respectively. FIGS. 1 and 3 illustrate that the imaging light reflected from each scan line portion of an object comprises a bundle of light arrays 32, 34, 36 having an expanding wedge shape configuration as the light rays enter the lens assembly 28 and having a contracting wedge shape configuration as the rays exit the imaging assembly 28. FIG. 2 shows the center planes 33, 35, 37 of each of these wedge shaped bundles of light rays 32, 34, 36 respectively.

Figure 5:
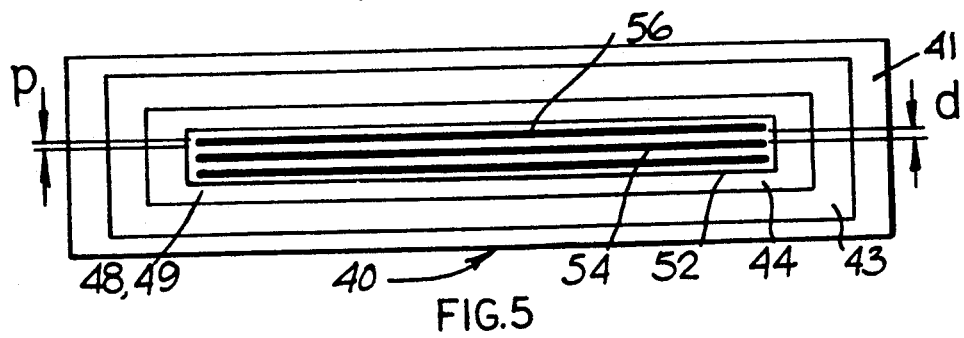
FIG. 5 is a top plan view of the photosensor assembly shown in FIG. 3 with a transparent plate removed.

A photosensor assembly 40 is shown in cross-section in FIG. 3. The photosensor assembly 40 may comprise a generally parallelepiped-shaped member having a front face surface 41 and a back face surface 42. The front faces has first generally parallelepiped-shaped recess 43 extending inwardly therefrom. A second generally parallelepiped-shaped recess extends further inwardly from the first recess 43. The second recess is defined by peripheral side walls 45 extending perpendicular to front face surface 41 and a pedestal 49 which projects outwardly from bottom wall 46 and which comprises a pedestal sidewall 47 and a pedestal front face surface 48 parallel to front face surface 41. The pedestal front face surface 48 is positioned in coplanar relationship with image plane II. Parallel linear photosensor arrays 52, 54, 56 which in a preferred embodiment comprise CCD arrays are positioned in spaced apart relationship on pedestal front face 48 and thus lie in image plane II, FIGS. 2 and 5.

Each linear photosensor array generates a data signal representative of the intensity of light impinged thereon which is transmitted via leads 58, 59 to appropriate signal processing software and or storage media. In the optical scanning assembly illustrated in FIG. 1, the scanned data from two of the three sensors is buffered and stored in an appropriate number of lines in random access memory of an associated computer (not shown). The data is then shifted as a function of scan speed such that data representative of the three color component images of each scan line portion of the object are stored together. The stored data may be used to reproduce a color image of the object which is scanned. Typical display devices are color CRT's and color printers (not shown).

Figure 4:
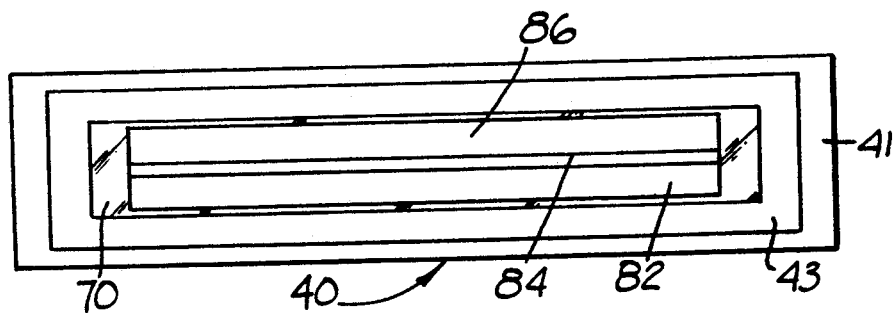
FIG. 4 is a top plan view of the photosensor assembly shown in FIG. 3 with a transparent plate in place.

As illustrated in FIGS. 1, 3, and 4 a transparent plate 70 is mounted in the second recess 44 of the photosensor assembly 40. (The transparent plate is not shown in FIG. 2 or in FIG. 5.) The transparent plate may be a generally parallelepiped-shaped plate having a first planer surface portion 72 lying in a plane AA parallel to image plane II and having a second planer surface portion 74 lying in a plane BB parallel to planes AA and II. The transparent plate 70 may have a slight recess (not shown) about its periphery of a predetermined height to enable it to be placed into recess 44 in the photosensor assembly at a predetermined distance from the front face 48 of pedestal 49.

As best illustrated in FIGS. 3 and 4, adjacent surface regions of transparent plate 70 aligned with photosensors 52, 54, 56 respectively are coated with different filter coatings 82, 84, 86. The coatings are extremely thin, typically on the order of 2.5 μm. In one preferred embodiment, the first filter coating 82 is a dichroic material adapted to transmit red light, the second filter coating 84 is a dichroic material adapted to transmit green light, and the third filter coating 86 is a dichroic material adapted to transmit blue light. The coatings are preferably placed on the first planer surface portion 72 located proximal pedestal surface 48 rather than the planar surface portion 74 located distal the pedestal so as to maintain the filter coatings within a generally dust free enclosure.

It will be appreciated from FIG. 3 that the different wedge shaped bundles of light rays 32, 34, 36 associated with scan images 52, 54, 56 overlap with one another in the portions thereof extending from the imaging assembly 28 until they reach plane MM. At plane MM the bundles of light rays become separated. As illustrated in FIG. 3, MM is position at a distance "a" from image plane II. The dimension "a" is a function of linear sensor spacing "d" (distance between photosensor longitudinal centerlines, FIG. 5), sensor pixel width "p" (measured perpendicular to the longitudinal axis of the associated linear sensor array, FIG. 5), and the effective F-number "f" of the lens assembly (effective F-number is an optical parameter well known in the art). The distance "a" may be expressed by the mathematical formula $a = [(d-p)/2]/\tan[\sin^{-1}(\frac{1}{2}f)]$. It is critical that the distance "x" between the surface AA supporting the filter coatings and image plane II is no greater than "a" to prevent filtering of each imaging light beam by more than one filter. The filter coatings may alternatively be placed upon surface BB of glass plate 70 so long as surface BB is positioned no more than dimension "a" from image plane II.

Figure 6:
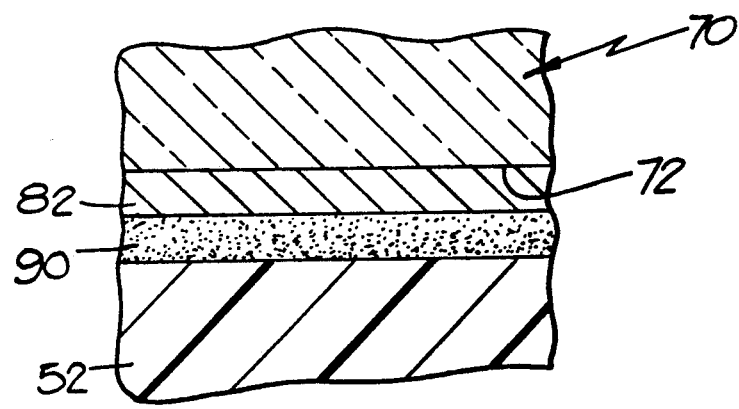
FIG. 6 is a detail cross-sectional side elevation view of a filter coated glass plate adhered to a linear photosensor array with optical adhesive.

In one preferred embodiment of the invention the photosensor unit comprises a CCD unit with linear photosensor arrays which are each 29.2 mm long and which are spaced apart from center line to center line at a distance "d" of 0.2 mm. The width "p" of the pixels in each linear photosensor array is 0.008 mm. The lens assembly has an effective F-number "f" of 4.5. The distance "x" between image plane II and plate surface 72 to which the filter coatings are applied is less that "a" which equals 859 μm. In a most preferred embodiment the filter coatings have an optical adhesive applied thereto which comes into direct contact with the surface of the associated CCD arrays such that the filters are in optical contact with the associated CCD arrays. A typical optical adhesive which may be used for this purpose is commercially available under the product designation of Norland Optical Adhesive 61, from Norland Products Inc., having a business located in New Brunswick, N.J., 08902. The optical adhesive coating would typically have a thickness of about 10 μm. A schematic elevation view showing a filter coating 82 applied to glass plate surface 72 and adhered to CCD array 52 by optical adhesive 90 is shown in FIG. 6.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A light sensor assembly comprising:

a) a plurality of parallel, spatially separated, linear photosensor means for generating a plurality of light sensing signals indicative of the intensity of light in predetermined spectral regions impinged thereon;

b) transparent plate means for transmitting light to said photosensor means positioned in adjacent overlying relationship with said photosensor means;

c) a plurality of filter coating means disposed on a surface portion of said transparent plate means in alignment with said plurality of photosensor means for filteringly transmitting said light in each of said predetermined different spectral regions to said photosensor means; whereby each of said linear photosensor means receives light from a different one of said predetermined spectral regions;

said plurality of photosensor means being arranged in a first plane, said plurality of filter coating means being arranged in a second plane parallel to said first plane.

2. The invention of claim 1, said transparent plate means comprising a first surface portion positioned proximal said photosensor means and a second surface portion positioned distal said photosensor means said plurality of filter coating means being disposed on said first surface of said transparent plate means.

3. The invention of claim 1, said plurality of photosensor means and said plurality of filter coating means being disposed in a common enclosure.

4. The invention of claim 1, said filter coating means comprising dichroic coatings.

5. The invention of claim 1, said light sensor assembly comprising a subassembly of an optical imaging device.

6. The invention of claim 1 said filter coating means being in optical contact with associated photosensor means.

7. The invention of claim 1, said transparent plate means comprising a first surface portion positioned proximal said linear photosensor arrays and a second surface portion positioned distal said photosensor arrays, said plurality of filter coating means being disposed on said first surface of said transparent plate means, said plurality of photosensor means being provided on a common flat surface portion of a photosensor unit, said plurality of linear photosensor arrays and said plurality of filter coating means being disposed in a common enclosure defined by at least a portion of said transparent plate means and at least a portion of said common flat surface portion of said photosensor unit, said filter coating means comprising dichroic coatings, and said plurality of linear photosensor means comprising CCD arrays.

8. A method of generating a data signal representative of a color image of an object comprising the steps of:

a) adhering a plurality of different filter coatings to different regions of a first planar surface portion of a transparent plate;

b) positioning the transparent plate over a plurality of different linear photosensor arrays such that a different filter coating is aligned with each of the different photosensor arrays;

c) passing focused imaging light from the object through the transparent plate and filter coatings disposed thereon to form a single two-dimensional image encompassing said plurality of linear photosensor arrays;

d) generating a data signal indicative of the intensity of light impinged upon each of the photosensor arrays.

9. The invention of claim 8 wherein the step of adhering filter coatings comprises adhering dichroic filter coatings.

10. The invention of claim 9 wherein the step of positioning the plate over the linear photosensor arrays comprises positioning the first surface portion of the plate proximate the photosensors.

11. The invention of claim 8 wherein the step of positioning the plate over the photosensor arrays comprises forming an enclosure which contains the filter coatings and the photosensor arrays.

12. The invention of claim 8 comprising the further step of placing each filter coating in optical contact with the aligned linear photosensor array.

13. The invention of claim 8 wherein the linear photosensor arrays comprise a common pixel width "p" and are separated by equal spacing intervals "d" and wherein the linear photosensor arrays comprise a portion of an optical scanning apparatus having an imaging assembly with an effective F-number of "f" and wherein the step of positioning the transparent plate over the linear photosensor arrays comprises positioning the filter coatings at a distance no greater than a distance "a" from the photosensor arrays where $a=[d-p)/2]/\tan[\sin^{-1}(\frac{1}{2}f)]$.

14. An optical scanning device for generating a data signal representative of an object which is scanned comprising:
   a) light source means for illuminating the object;
   b) imaging means for projecting imaging light from the object onto an image plane;
   c) a plurality of parallel linear photosensor means positioned at said image plane for generating a plurality of light sensing signals indicative of the intensity of imaging light in predetermined spectral regions impinged thereon;
   d) transparent plate means for transmitting imaging light to said plurality of photosensor means positioned in overlying relationship with said photosensor means;
   e) a plurality of parallel, elongated filter coating means disposed on a surface portion of said transparent plate means in respective parallel alignment with said plurality of photosensor means for filteringly transmitting said imaging light in predetermined different spectral regions to said photosensor means whereby each photosensor means receives light from a different one of said predetermined spectral regions.

15. The invention of claim 14, said imaging means having an effective F-number of "f", said plurality of photosensor means being of an equal width "p" and arranged in a first plane at equal spacing intervals of "d", said plurality of filter coating means being arranged in a second plane parallel to said first plane, said first plane being spaced from said second plane by a distance of no more than a distance "a", where $a=[d-p)/2]/\tan[\sin^{-1}(\frac{1}{2}f)]$.

16. The invention of claim 14, said transparent plate means comprising a first surface portion positioned proximal said photosensor means and a second surface portion positioned distal said photosensor means said plurality of filter coating means being disposed on said first surface of said transparent plate means.

17. The invention of claim 14, said plurality of photosensor means and said plurality of filter coating means being disposed in a common enclosure.

18. The invention of claim 14, said filter coating means comprise dichroic coatings.

19. The invention of claim 14, said plurality of linear photosensor means comprise CCD arrays.

20. The invention of claim 14 said linear photosensor means being in optical contact with associated ones of said filter coating means.

21. The invention of claim 20 linear photosensor means being adhered to associated ones of said filter layer means by optical adhesive.

22. The invention of claim 14, said transparent plate means comprising a first surface portion positioned proximal said photosensor means and a second surface portion positioned distal said photosensor means, said plurality of filter coating means being disposed on said first surface of said transparent plate means, said plurality of photosensor means being provided on a common flat surface portion of a photosensor unit, said plurality of photosensor means and said plurality of filter coating means being disposed in a common enclosure defined by at least a portion of said transparent plate means and at least a portion of said common flat surface portion of said photosensor unit, said imaging means having an effective F-number of "f", said plurality of photosensor means being of an equal width of "p" and arranged in a first plane at equal spacing intervals of "d", said plurality of filter coating means being arranged in a second plane parallel to said first plane, said first plane being spaced from said second plane by a distance of no more than a distance "a", where $a=[d-p)/2]/\tan[\sin^{-1}(\frac{1}{2}f)]$, said filter coating means comprise dichroic coatings, and said plurality of photosensor means comprise CCD arrays.

* * * * *